(12) United States Patent
Haunreiter et al.

(10) Patent No.: US 7,866,023 B2
(45) Date of Patent: Jan. 11, 2011

(54) ARRANGEMENT FOR FASTENING A SUPPORT OF A SCALE AND METHOD FOR FASTENING THE SUPPORT, AS WELL AS A LINEAR MEASURING DEVICE

(75) Inventors: Johannes Haunreiter, Burghausen (DE); Alfred Affa, Stein/Traun (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 1162 days.

(21) Appl. No.: 11/516,233

(22) Filed: Sep. 6, 2006

(65) Prior Publication Data
US 2007/0056156 A1   Mar. 15, 2007

(30) Foreign Application Priority Data
Sep. 14, 2005   (DE) .................. 10 2005 044 000

(51) Int. Cl.
  *B23P 11/00*   (2006.01)
(52) U.S. Cl. .................. 29/434; 29/428; 29/525.01; 29/525.02; 29/525.11
(58) Field of Classification Search .................. 29/434, 29/428, 525.01, 525.02, 525.11
See application file for complete search history.

(56) References Cited

U.S. PATENT DOCUMENTS

| 2,164,217 A | * | 6/1939 | Little ..................... 33/439 |
| 4,509,262 A | | 4/1985 | Nelle |
| 4,608,758 A | | 9/1986 | Voelk et al. |
| 6,163,970 A | | 12/2000 | Nelle et al. |

FOREIGN PATENT DOCUMENTS

GB   83 02 162.0   11/1987

* cited by examiner

*Primary Examiner*—Derris H Banks
*Assistant Examiner*—Azm Parvez
(74) *Attorney, Agent, or Firm*—Brinks Hofer Gilson & Lione (57) ABSTRACT

An arrangement for fastening a support of a scale of a linear measuring device on a mounting surface of an object to be measured. The arrangement includes a clamping jaw and a force-exerting element urging the clamping jaw against the support. The clamping jaw acts together with the support in such a way that the clamping jaw urges said support with a clamping force that includes 1) a first force component against the mounting surface by the force-exerting element and 2) a second force component that urges the support against an attachment face extending transversely to the mounting surface. The attachment face is directly constituted by an attachment body, which can be fixed positively and free of play in a receptacle on the object to be measured.

16 Claims, 6 Drawing Sheets

ARRANGEMENT FOR FASTENING A SUPPORT OF A SCALE AND METHOD FOR FASTENING THE SUPPORT, AS WELL AS A LINEAR MEASURING DEVICE

Applicants claim, under 35 U.S.C. §119, the benefit of priority of the filing date of Sep. 14, 2005 of a German patent application, copy attached, Serial Number 10 2005 044 000.2, filed on the aforementioned date, the entire contents of which is incorporated herein by reference.

BACKGROUND OF THE INVENTION

1. Field of the Invention

The present invention relates to an arrangement for fastening a support of a scale of a linear measuring device to a mounting surface of an object to be measured. The present invention furthermore relates to a method for fastening the support. Finally, the present invention relates to a linear measuring device.

2. Discussion of Related Art

Linear measuring devices include an arrangement for fastening a support of a scale and of a scanning unit which scans the scale. They are employed in particular in connection with processing machines for measuring the relative movement of a tool in relation to a workpiece to be processed, with robotic devices, and increasingly also in the semiconductor industry.

An arrangement for fastening a support of a scale is described in DE 83 02 162 U1. The arrangement has a clamping claw, which urges the housing of a linear measuring device against a mounting face of the object to be measured. The clamping jaw is fastened on the object to be measured by a screw, wherein the clamping jaws works together with an inclined clamping face of the housing. In this way the clamping jaw is urged by one force component against the mounting face by the screw, and is urged against an attachment face extending transversely to the mounting face by another force component. This attachment face is a protrusion on the clamping jaw itself.

When tightening the screw, the clamping jaw exerts a clamping force on the housing. In the course of this the clamping jaw is displaced, and therefore also the attachment face formed on it. Because of this the attachment face does not constitute a defined and stable positioning and alignment aid for the housing.

DE 83 02 162 U1 also describes a method for fastening a support of a scale on a mounting face. In the course of this a clamping jaw is urged against a clamping face of the housing of a linear measuring device by turning a screw into the object to be measured. By this a clamping force is exerted on the housing, which urges the housing against the mounting face and against an attachment face of the clamping jaw. Following the fastening of the clamping jaw on the object to be measured, the clamping jaw is positively attached to the object to be measured by pins.

Since the positive fixation takes place only after the clamping force has been generated, it is not possible to prevent a displacement of the attachment face in the course of fastening.

OBJECTS AND SUMMARY OF THE INVENTION

An object of the present invention is based on providing an arrangement for fastening the support of a scale, by which the support can be fastened in a simple way on a mounting face, and which makes possible the unequivocal positioning and alignment of the support.

In accordance with the present invention, this object is attained by an arrangement for fastening a support of a scale of a linear measuring device on a mounting surface of an object to be measured. The arrangement includes a clamping jaw and a force-exerting element urging the clamping jaw against the support. The clamping jaw acts together with the support in such a way that the clamping jaw urges said support with a clamping force that includes 1) a first force component against the mounting surface by the force-exerting element and 2) a second force component that urges the support against an attachment face extending transversely to the mounting surface. The attachment face is directly constituted by an attachment body, which can be fixed positively and free of play in a receptacle on the object to be measured.

It is a further object of the present invention to recite a method, by which a support of a scale can be fastened in a simple manner to a mounting face, and by which an unequivocal positioning and alignment of the support is made possible.

The above object is attained by a method for fastening a support of a scale of a linear measuring device on a mounting surface of an object to be measured. The method includes providing a clamping jaw and providing a force-exerting element urging the clamping jaw against a support, wherein the clamping jaw acts together with the support in such a way that the clamping jaw urges the support with a force component against a mounting face by the force-exerting element, and with a second force component that urges the support against an attachment face of an attachment body extending transversely to the mounting face. The method further includes fixing an attachment body in a manner which is positive and free of play in a receptacle on the object, wherein the attachment body is constituted by the attachment body and the support is directly attached to the attachment face. The method also includes bringing the clamping jaw into contact with the support and urging the support against the attachment face.

A further object of the present invention is to provide a linear measuring device which can be fastened in a simple manner and can be unequivocally positioned.

The above object is attained by a linear measuring device that includes a support for a scale and an arrangement for fastening the support on a mounting surface of an object to be measured. The arrangement includes a clamping jaw and a force-exerting element urging the clamping jaw against the support. The clamping jaw acts together with the support in such a way that the clamping jaw urges said support with a clamping force that includes 1) a first force component against the mounting surface by the force-exerting element and 2) a second force component that urges the support against an attachment face extending transversely to the mounting surface. The attachment face is directly constituted by an attachment body, which can be fixed positively and free of play in a receptacle on the object to be measured.

The advantages obtained by the present invention include that the position of the attachment face in a direction transversely in relation to the mounting face remains as unaffected as possible by a displacement of the clamping jaw itself. Since the attachment face is constituted by the attachment body itself, which is positively anchored in the object to be measured, and this attachment body is stably fixed in place in a fitted receptacle of the object to be measured, the positioning and alignment of the support has been unequivocally predefined by means of the position of the attachment face constituted by the attachment body. Simple handling can also be provided, because the attachment body constitutes the holder of the clamping jaw, and the clamping jaw can be shifted in the longitudinal direction of the attachment body in the course of mounting.

Further details and advantages of the present invention will be explained in the ensuing description of exemplary embodiments in conjunction with the drawings.

DETAILED DESCRIPTION OF THE PREFERRED EMBODIMENTS

Figure 1:
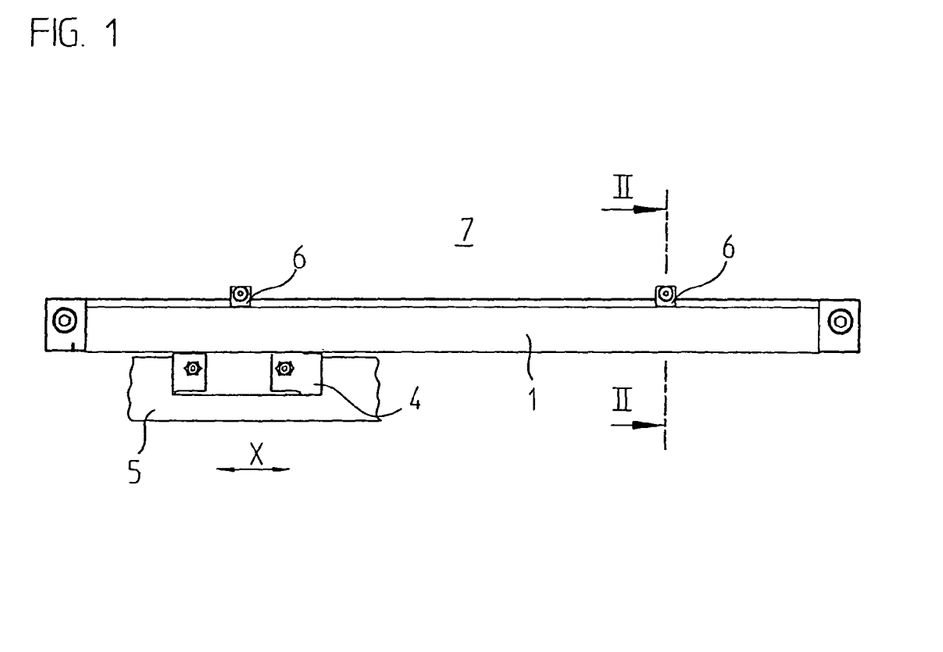
FIG. 1 represents an embodiment of a linear measuring device with an embodiment of a scanning unit embodied in accordance with the present invention.

A first exemplary embodiment of the present invention is represented in FIGS. 1 to 5. FIG. 1 shows a plan view of an encapsulated linear measuring device with a housing 1 in the form of a hollow profiled element, in whose interior a scale 2 is fastened. The scale 2 has a measuring graduation 3, which can be scanned by a scanning unit which is movable relative to the scale 1 in the measuring direction X. The scanning unit is connected with an object 5 to be measured by a carrier 4. This object 5 is the bed of a machine tool, for example.

Figure 2:
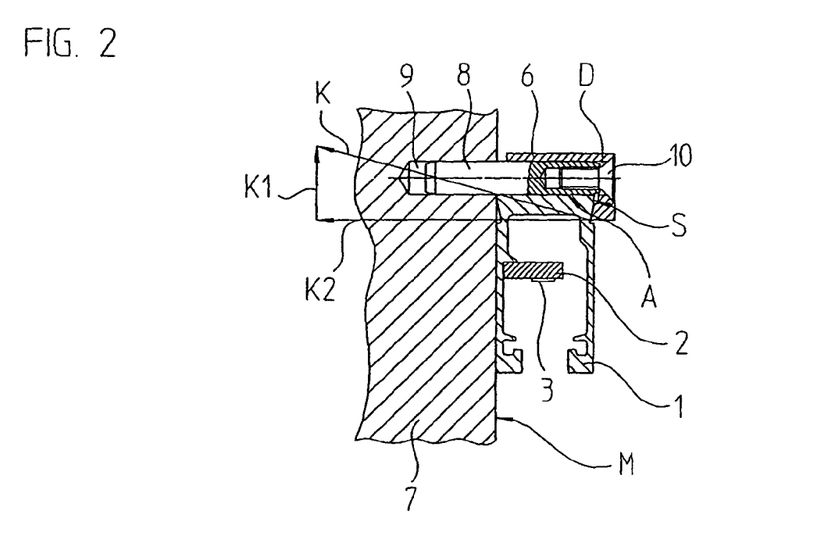
FIG. 2 shows a cross section along the lines II-II in the linear measuring device in accordance with FIG. 1 without the scanning unit.

The housing 1 as the support of the scale 2 having the measuring graduation 3 is fastened on a mounting face M of the other objects 7 to be measured by at least one clamping jaw 6. This object 7 is for example the carriage of a machine tool.

The clamping jaw 6 is designed in such a way that the clamping force K of the clamping jaw 6 acting on the housing 1 is divided into two force components K1 and K2, which extend perpendicularly to the longitudinal extension of the housing 1 in a plane which is perpendicular to the longitudinal extension of the housing 1, i.e the sectional plane II-II. For this purpose the clamping face S of the housing 1 which corresponds with the clamping jaw 6 is inclined relative to the mounting face M. The clamping jaw 6 urges the housing 1 with a force component K2 against the mounting face M, and with a further force component K1 directly against an attachment face A of an attachment body 8.

In this embodiment the attachment body 8 is a fitted pin 8, which is positively fixed without play in a receptacle in the form of a fitted bore 9 on the first of the objects 7 to be measured. Together with the fitted bore 9, the fitted pin 8 constitutes a press fit.

The length of the fitted pin 8 is preferably selected in such a way that the housing rests over its entire length against the fitted pin 8.

The clamping jaw 6 has a through-bore D, by which it is conducted on the fitted pin 8 in the linear direction of the latter. A force-exerting element in the form of a screw 10 has been screwed into the fitted pin 8 for producing the clamping force. By this screw 10 the clamping jaw 6 is displaced on the fitted pin 8 in the linear direction of the latter.

Figure 3:
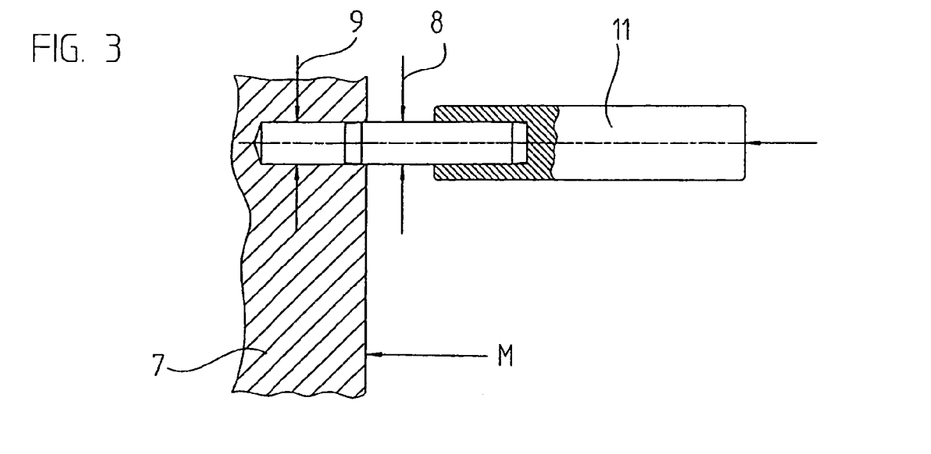
FIG. 3 shows a possible method step for fastening the housing of the linear measuring device in accordance with FIG. 2 in accordance with the present invention.
Figure 4:
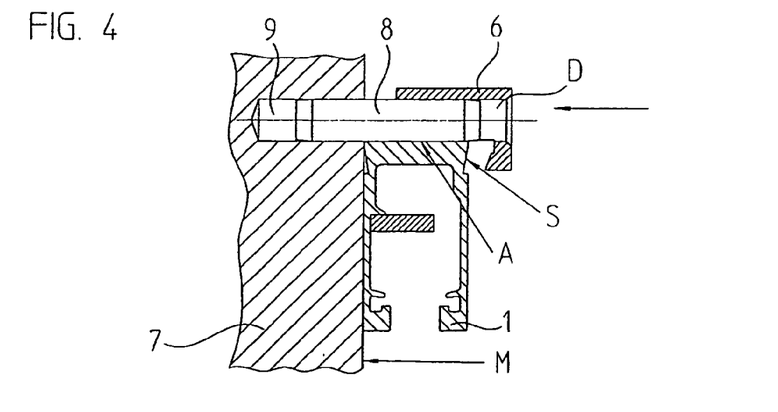
FIG. 4 shows a further possible method step for fastening the housing of the linear measuring device in accordance with FIG. 2 in accordance with the present invention.
Figure 5:
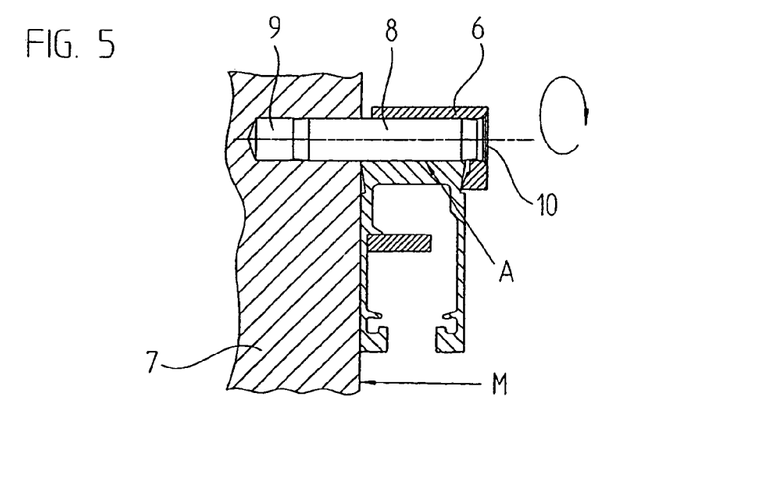
FIG. 5 shows a possible final mounting of the housing of the linear measuring device in accordance with FIG. 2 in accordance with the present invention.

FIGS. 3 to 5 represent the individual method steps for fastening the housing 1 on the mounting face M of the object 7 to be measured. In the first method step the fitted bore 9 is cut into the object 7 and the fitted pin 8 is pressed in. A pressing tool 11 used for this is schematically represented in FIG. 3.

The fitted pin 8 constitutes the attachment face A for attaching the housing 1. After attaching the housing 1 to the fitted pin 8, the clamping jaw 6 is brought into contact with the clamping face S of the housing 1, as represented in FIG. 4. In the course of this, the through-bore D of the clamping jaw 6 is pushed onto the fitted pin 8.

Now, in accordance with FIG. 5 the screw 10 is screwed into an interior thread of the fitted pin 8 and the clamping force is generated in this way. In the course of this the clamping jaw 8 is displaced in the linear direction in relation to the fitted pin 8 and is guided on it, but without the position of the attachment face A for the housing 1 being displaced. The alignment of the housing 1 defined by the fitted pin 8 is maintained in the course of this.

The present invention can be employed particularly advantageously with relatively long housings 1, in connection with which several clamping jaws 6 must be used for stable fastening. In this case first all fitted pins 8 are cut in a line into the object 7, and then the housing 1 is attached to it and is aligned because of this. Thereafter the clamping jaws 6 are brought into engagement with the housing 1 and the respective clamping force K required for the fixed fastening of the housing 1 is applied. In connection with the exemplary embodiment in accordance with FIG. 1, for example, two clamping jaws 6, which are spaced apart from each other in the measuring direction X, are used for aligning and stable fastening of the housing 1.

The structure of the linear measuring devices explained in what follows by FIGS. 6 to 11 corresponds to a large extent to that of the first exemplary embodiment. The arrangement and the method for fastening also corresponds to the explained example, so that only the differences with the first exemplary embodiment will be explained in what follows.

Figure 6:
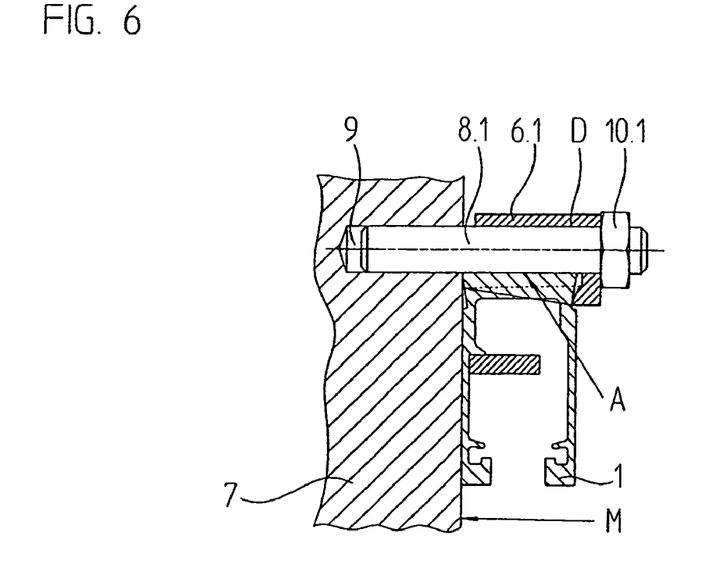
FIG. 6 is a cross section through a second exemplary embodiment of a linear measuring device in accordance with the present invention.

In connection with the exemplary embodiment in accordance with FIG. 6, the screw 10 is replaced by a nut 10.1, which is screwed onto an exterior thread of the fitted pin 8.1 and displaces the clamping jaw 6.1 in the longitudinal direction of the fitted pin 8.1.

Figure 7:
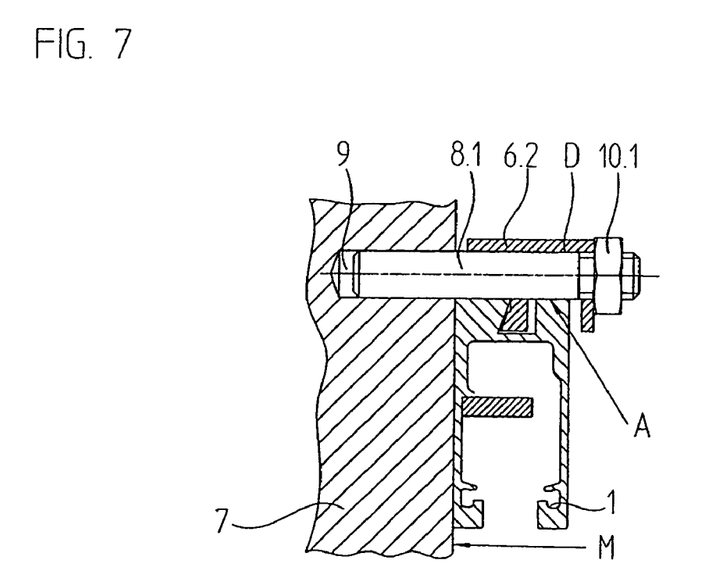
FIG. 7 is a cross section through a third exemplary embodiment of a linear measuring device in accordance with the present invention.

The exemplary embodiment represented in FIG. 7 corresponds to the one in FIG. 6, only here the clamping face S is arranged in a groove of the housing 1, and the clamping jaw 6.2 in the groove works together with the housing 1.

Figure 8:
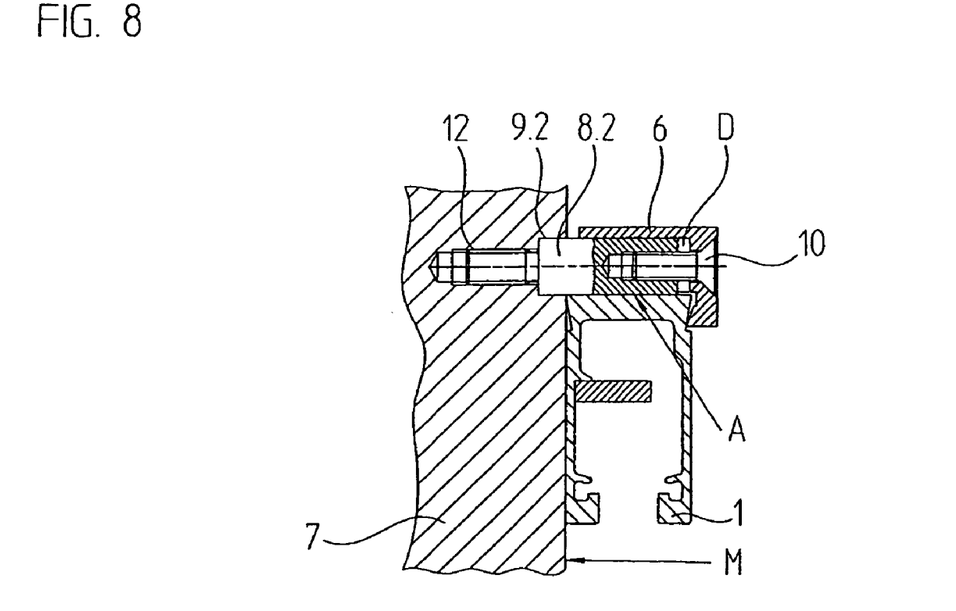
FIG. 8 is a cross section through a fourth exemplary embodiment of a linear measuring device in accordance with the present invention.

In connection with the fourth exemplary embodiment in accordance with FIG. 8, the attachment body is constituted by a fitted pin 8.2 with a fitting area for producing a fitting for centering in the fitted bore 9.2 in the object 7 and with a threaded shoulder 12 for screwing the fitted pin 8.2 into the object 7.

Figure 9:
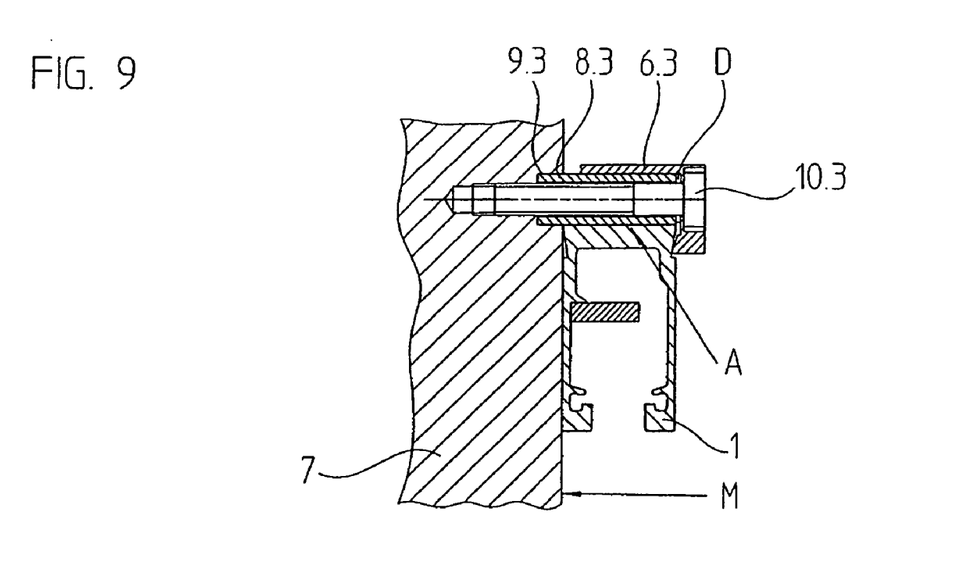
FIG. 9 is a cross section through a fifth exemplary embodiment of a linear measuring device in accordance with the present invention.

As FIG. 9 shows, a fitted sleeve 8.3, which is received free of play in a fitted bore 9.3, can take on the function of the attachment face A. Now the clamping jaw 6.3 can be fastened by a screw screwed into, or a nut screwed onto the fitted sleeve 8.3 or, as represented in FIG. 9, by a screw 10.3, which has been screwed into the object 7.

Figure 10:
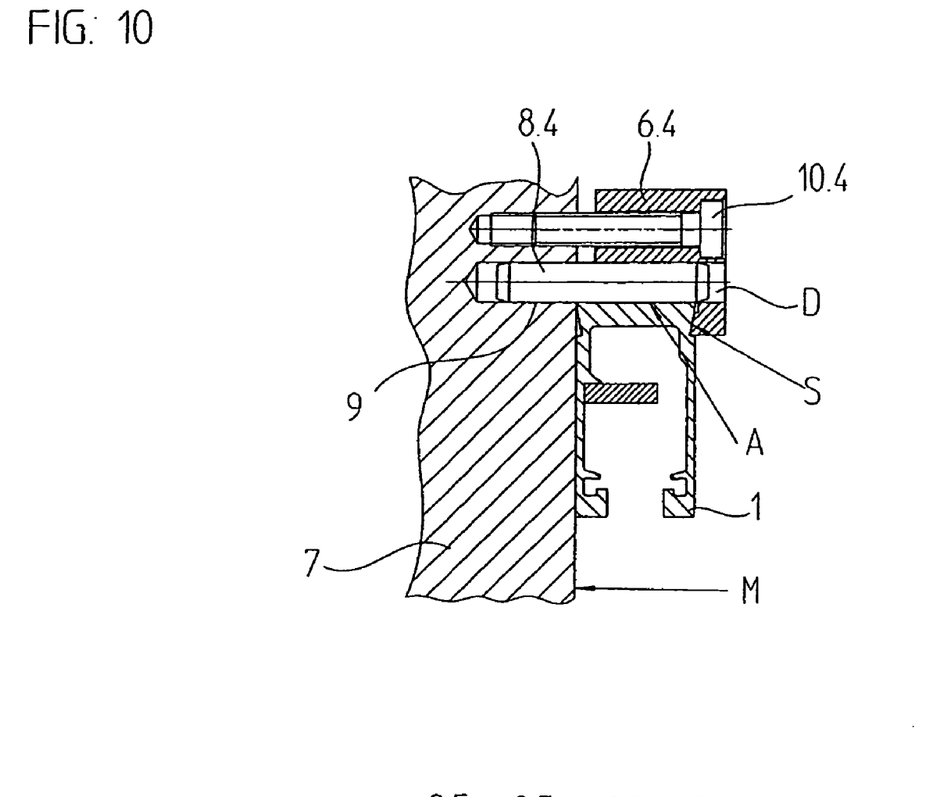
FIG. 10 is a cross section through a sixth exemplary embodiment of a linear measuring device in accordance with the present invention.

In connection with the sixth exemplary embodiment in accordance with FIG. 10 the fitted pin 8.4 performs the same functions as in the first exemplary embodiment, but with the difference that the clamping jaw 6.4 is urged against the clamping face S by a screw 10.4, which has been screwed in next to the fitted pin 8.4.

Figure 11:
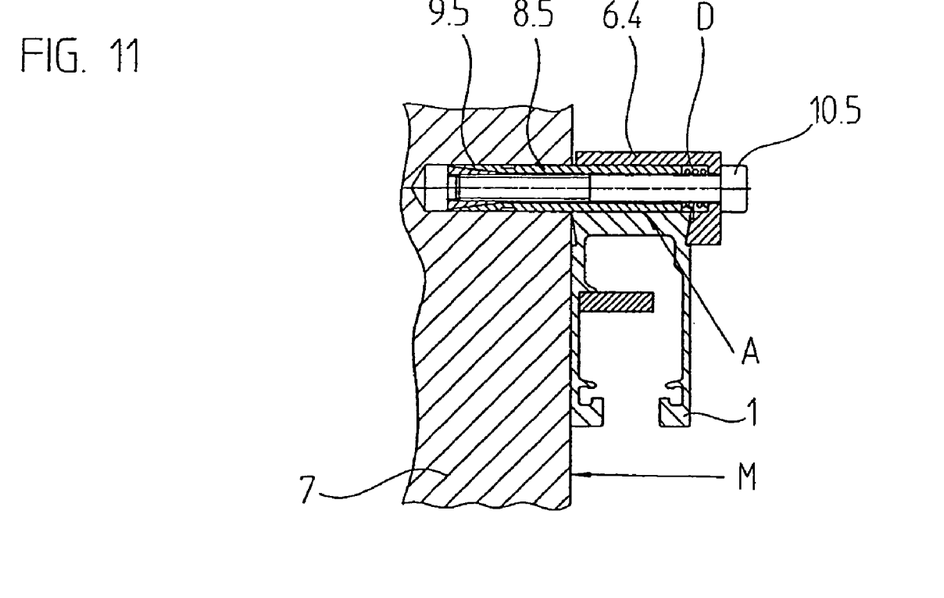
FIG. 11 is a cross section through a seventh exemplary embodiment of a linear measuring device in accordance with the present invention.

The seventh exemplary embodiment explained in accordance with FIG. 11 corresponds to a large extent to the exemplary embodiment in accordance with FIG. 9, except that the fitted sleeve 8.3 has been replaced by a dowel 8.5. The represented dowel 8.5 is a threaded dowel, wherein stable anchoring is achieved in the form of clamping in the bore 9.5 and at the same time by the production of the clamping force of the clamping jaw 6.5 by the screw 10.5. In the process the parts of the dowel 8.5 are pressed or wedged in the bore 9.5. In a non-represented way it is also possible to use a hammered-in dowel in place of the threaded dowel.

In place of the housing 1, the scale 2 itself can also be fastened to the mounting face M by the above described arrangement as the support of the measuring graduation, or scale 3. The clamping face is then arranged directly on the scale, and the clamping jaw acts directly together with the scale and urges the latter against the mounting face, as well as against the attachment body.

Figure 12:
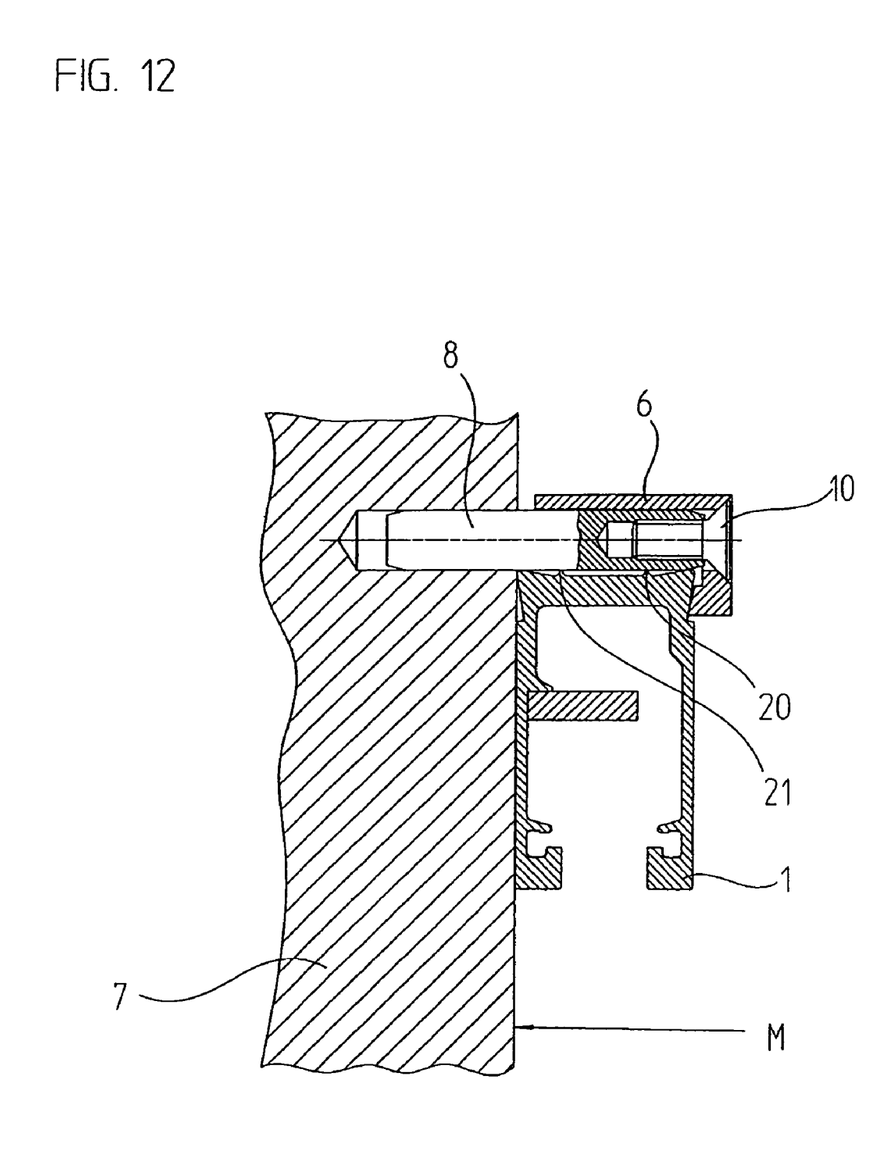
FIG. 12 is a cross section through an eighth exemplary embodiment of a linear measuring device in accordance with the present invention.

An advantageous embodiment of the housing 1 will be explained by the eighth exemplary embodiment represented by means of FIG. 12. The face of the housing 1 located opposite the attachment body 8 has two protrusions 20, 21, which are spaced apart from each other and contact the attachment body 8 in a defined manner at two locations, which are spaced apart from each other. Thus, convex or concave curvatures do not affect the contact with the attachment body 8. Preferably the protrusions 20, 21 are strips extending in the measuring direction X, which can also be designed to be interrupted to form sections. This design of the housing 1 can be employed in all above described examples.

The foregoing description is provided to illustrate the present invention, and is not to be construed as a limitation. Numerous additions, substitutions and other changes can be made to the present invention without departing from its scope as set forth in the appended claims.

We claim:

1. An arrangement for fastening a support of a scale of a linear measuring device on a mounting surface of an object to be measured, the arrangement comprising:
    a clamping jaw;
    a force-exerting element urging said clamping jaw against said support, wherein said clamping jaw acts together with said support in such a way that said clamping jaw urges said support with a clamping force that includes 1) a first force component against said mounting surface by said force-exerting element and 2) a second force component that urges said support against an attachment face extending transversely to said mounting surface, wherein said attachment face is directly constituted by an attachment body, which can be fixed positively and free of play in a receptacle on said object to be measured.

2. The arrangement in accordance with claim 1, wherein said clamping jaw is displaced on said attachment body for generating said clamping force.

3. The arrangement in accordance with claim 2, wherein said clamping jaw has a through-bore for guiding said clamping jaw along said attachment body.

4. The arrangement in accordance with claim 1, wherein said force-exerting element comprises a screw or a nut, which works together with a thread of said attachment body.

5. The arrangement in accordance with claim 1, wherein said force-exerting element is a screw, which can be screwed into said object to be measured.

6. The arrangement in accordance with claim 1, wherein said attachment body comprises either a fitted pin or a fitted sleeve.

7. The arrangement in accordance with claim 1, wherein said support comprises a clamping face, which is inclined in a direction toward said mounting face and which is engaged by said clamping jaw.

8. The arrangement in accordance with claim 1, wherein said support comprises two strip-like protrusions, which are spaced apart from each other, extend in a measuring direction and contact said attachment body.

9. A method for fastening a support of a scale of a linear measuring device on a mounting surface of an object to be measured, the method comprising:
    providing a clamping jaw;
    providing a force-exerting element urging said clamping jaw against a support, wherein said clamping jaw acts together with said support in such a way that said clamping jaw urges said support with a force component against a mounting face by said force-exerting element, and with a second force component that urges said support against an attachment face of an attachment body extending transversely to said mounting face;
    fixing an attachment body in a manner which is positive and free of play in a receptacle on said object, wherein said attachment body is constituted by said attachment body and said support is directly attached to said attachment face;
    bringing said clamping jaw into contact with said support; and
    urging said support against said attachment face.

10. The method in accordance with claim 9, wherein said fixing comprises hammering said attachment body into a fitted bore in said object.

11. The method in accordance with claim 9, further comprising guiding said clamping jaw on and along said attachment body.

12. The method in accordance with claim 10, further comprising guiding said clamping jaw on and along said attachment body.

13. A linear measuring device, comprising:
    a support and a scale fastened to said support; and
    an arrangement for fastening said support on a mounting surface of an object to be measured, the arrangement comprising:
        a clamping jaw;
        a force-exerting element urging said clamping jaw against said support, wherein said clamping jaw acts together with said support in such a way that said clamping jaw urges said support with a clamping force that includes 1) a first force component against said mounting surface by said force-exerting element and 2) a second force component that urges said support against an attachment face extending transversely to said mounting surface, wherein said attachment face is directly constituted by an attachment body, which can be fixed positively and free of play in a receptacle on said object to be measured.

14. The method in accordance with claim 9, wherein a scale is fastened to said support, wherein said scale comprises a measuring graduation that is scanned by a scanning unit that is movable relative to said scale.

15. The linear measuring device in accordance with claim 13, further comprising a scanning unit that is movable relative to a measuring direction relative to said scale.

16. The linear measuring device in accordance with claim 15, wherein said scale comprises a measuring graduation that is scanned by said scanning unit.

* * * * *